United States Patent Office 3,315,143
Patented Apr. 18, 1967

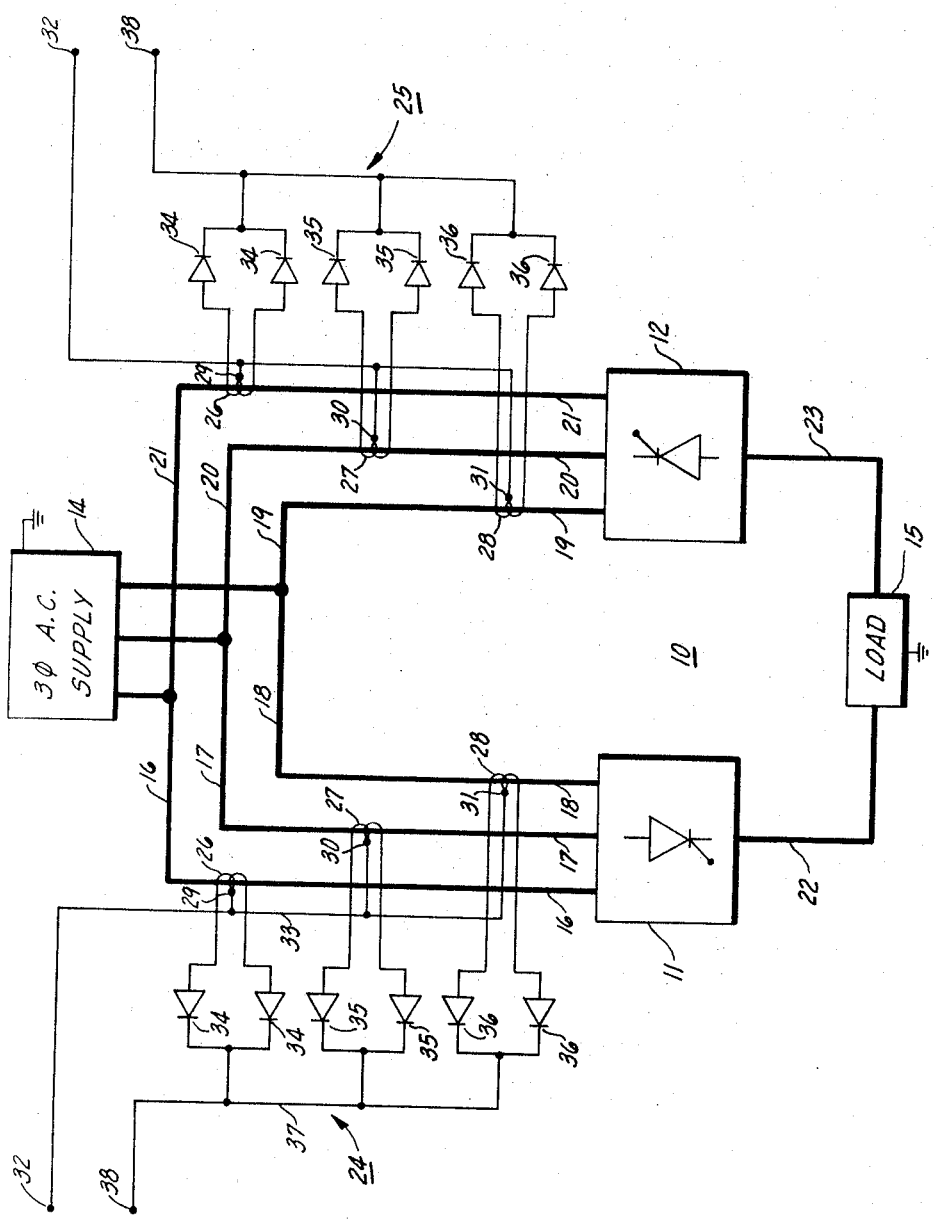
INVENTORS.
DENNIS I. LAWRENCE
BY RAYMOND B. DICZHAZY
FRANK H. WASHKO
Bosworth, Sessions, Herschow
& Knowles
ATTORNEYS

3,315,143
OUTPUT CURRENT POLARITY SENSING CIRCUIT FOR CYCLOCONVERTERS
Dennis I. Lawrence Solon, Raymond B. Diczhazy, Bainbridge Township, and Frank H. Washko, Bedford, Ohio, assignors to Lear Siegler, Inc., Los Angeles, Calif., a corporation of Delaware
Filed Nov. 18, 1964, Ser. No. 412,192
3 Claims. (Cl. 321—7)

This invention relates to the operation of cycloconverters and particularly to means for sensing the magnitude and/or polarity of the output current of a cycloconverter operating at any output frequency and including a D.C. output current.

A cycloconverter characteristically comprises two major elements, a positive current group and a negative current group, connected in parallel with each other between an alternating current source and the cycloconverter output circuit. The alternating current source supplying each of the current groups may be single or polyphase. A positive and negative current group, regardless of the number of phases in their alternating current supply source, produces a single phase output. The alternating current source is generally of some fixed frequency that is changed and delivered to the output circuit as lower frequency alternating or direct current.

As is well known, each group may consist of a number of rectifying and switching devices, such as mercury arc rectifiers, silicon controlled rectifiers, or thyratrons, connected in some known rectifier configuration. Current can flow through each of the groups in only one direction. Therefore, in order to supply alternating positive and negative half waves of output current or output current of both polarities, the positive and negative groups must be connected back to back with respect to the output circuit.

In cycloconverter operation, it is sometimes useful to be able to instantaneously sense and indicate which current group is conducting, i.e., providing output current. For example, instantaneous voltage differences exist between the two current-conducting groups during the greater part of the time a cycloconverter is operating. These voltage differences tend to drive intergroup circulating currents which reduce the output current delivered to the load. Such circulating currents cannot exist if only one current group is permitted to conduct at a time. Thus, if the conductive state of each of the current groups is controlled in accordance with indications of the conductive state of the other current group, currents circulating between the two groups can be prevented.

Such control can be accomplished through blanking circuits or means for permitting and preventing firing signals from acting on the current-conducting groups. Thus, information indicating that one current group is conducting may be used to control means for maintaining the other current group non-conducting. When the current output of the conducting group falls substantially to zero, an indication of this condition can be utilized to initiate the blanking of the conducting group and the unblanking of the non-conducting group.

In addition to being useful in connection with means for blanking or holding non-conducting either of the two current groups, information as to the magnitude and/or polarity of the cycloconverter output current can be used for other protective or regulator circuits.

An object of this invention is to provide circuit means for sensing and indicating the magnitude and/or polarity of the output current of a cycloconverter, i.e. the conductive state of the current groups. Another object is to provide such circuit means which operates independently of the output frequency of the cycloconverter. Still another object of this invention is to provide such circuit means which is isolated from the cycloconverter power circuits. Another object is to provide such circuit means in which power losses resulting from use of the circuit means in connection with the cycloconverter are held to a minimum.

The manner in which the foregoing objects are accomplished, together with other objects and advantages of this invention, will become apparent from the following description of a preferred embodiment taken together with the accompanying drawings showing a circuit diagram of sensing and indicating means and a diagrammatic cycloconverter.

In the single figure of the drawings, a cycloconverter is shown diagrammatically and indicated generally by the reference numeral 10. Cycloconverter 10 comprises a positive current-conducting group 11 and a negative current-conducting group 12. Positive and negative groups 11 and 12, respectively, are connected in parallel between a three-phase alternating current supply 14 and a single phase load 15. The three-phase supply is connected to positive and negative groups 11 and 12 through an input circuit including supply circuit means comprising phase conductors 16, 17 and 18 and phase conductors 19, 20 and 21, respectively. Single phase output conductors 22 and 23 connect positive group 11 and negative group 12 to load 15. As indicated by the controlled rectifier symbols within blocks 11 and 12 representing the positive and negative current-conducting groups, the two groups are connected back to back with respect to load 15 so that the two groups of switching and rectifying devices provide output currents of opposite polarity.

In operation of cycloconverter 10, when positive current group 11 conducts, output current is supplied to load 15 from current group 11, i.e. the cycloconverter output current is positive. When negative current group 12 conducts, output current is supplied to load 15 from current group 12, i.e. the cycloconverter output current is negative.

Indications of positive output current, i.e. output current provided by positive current group 11, are provided by the first section of a sensing and indicating circuit indicated generally at 24 on the left-hand side of the drawings and associated with positive current group 11 and its supply circuit means comprising phase conductors 16, 17 and 18. Indications of output current of opposite polarity are provided by the second section of a sensing and indicating circuit indicated generally at 25 on the right-hand side of the drawings and associated with negative current group 12 and its supply circuit means comprising phase conductors 19, 20 and 21. Circuits 24 and 25, comprising the first and second sections of the sensing and indicating circuit, differ only in the phase conductors with which they are associated and the output terminals at which their signals appear. Therefore, the following description of circuit 24 applies to circuit 25 also.

Phase conductors 16, 17 and 18, connected to positive current group 11 of cycloconverter 10, are provided with current transformers indicated by windings 26, 27 and 28, respectively. Windings 26, 27 and 28 of the current transformers have centertapped terminals 29, 30 and 31, respectively, which are connected together and to circuit output terminal 32 by conductor 33. The two ends of winding 26 of the current transformer associated with supply conductor 16 are each connected to a diode rectifier 34. Similarly, the two ends of secondary windings 27 and 28 are each connected to diode rectifiers 35 and 36, respectively. All of the diode rectifiers 34, 35 and 36 are arranged to conduct current in the same direction with respect to the ends of secondary windings 26, 27 and 28 to which each diode rectifier is connected. In other words, either the anodes of all the rectifiers or the cathodes of all the rectifiers are directly connected to the current transformer secondary windings.

The elements of the diode rectifiers 34, 35 and 36 not connected to secondary windings of the current transformers are all tied together and connected by conductor 37 to circuit output terminal 38.

Circuit 24, described above comprising the current transformers associated with supply phase conductors 16, 17 and 18 and the rectifying diodes for rectifying the output of their windings 26, 27 and 28 provides a direct current signal across output terminals 32 and 38 proportional to the current flowing in phase conductors 16, 17 and 18 from polyphase alternating current supply 14 into positive current group 11. Inasmuch as positive cycloconverter output current flowing out of positive current group 11 and into load 15 is provided only when current flows into current group 11 through supply phase lines 16, 17 and 18, the direct current signal appearing at the circuit output terminals 32 and 38 also indicates when cycloconverter current group 11 is conducting and current is flowing from it to load 15.

In addition to indicating the polarity of the cycloconverter output current, the direct current signal appearing at the output terminals 32 and 38 of circuit 24 is proportional to the total current supplied positive current group 11.

In similar fashion, a direct current signal appears at the output terminals 32 and 38 of section 25 of the sensing and indicating circuit, indicating the polarity of the cycloconverter output current. The direct current signal appearing at the output terminals of circuit section 25 is proportional to the total current supplied negative current group 12.

Sections 24 and 25 of the sensing and indicating circuit are responsive to generator or supply frequency feeding the cycloconverter rather than to cycloconverter output frequency. Thus, circuit section 24, associated with positive current group 11, and similar circuit section 25, associated with negative current group 12, will each provide appropriate direct current signals at their associated output terminals 32 and 38 acccording to the conducting and non-conducting condition of their associated current group, even when the corresponding output current is a direct current so long as the supply current alternates at a frequency detectable by the current transformers. The circuits of this invention in combination with a cycloconverter, therefore, provide useful and desired information about the magnitude and polarity of the cycloconverter output current during all output frequency conditions.

Although current transformers are preferred for sensing the flow of curent in supply phase conductors of the two current groups, shunts and diodes connected in series may also be employed in the supply phase conductors and provide similar indications of cycloconverter output current even when the output of the cycloconverter is direct current. The use of current transformers is preferred because of the isolation provided by them between the power circuits and those control circuits which might be connected to sensing and indicating circuit output terminals 32 and 38. The current transformers shown and described have center-tapped windings and are each connected to a pair of diodes to provide full wave rectification of the current produced in the secondary windings. It will be apparent that other rectifier configurations and/or windings without center-tapped terminals may be employed and interconnected in an appropriate manner to provide direct current output signals as provided by the circuit shown and described.

The direct current signals appearing at the circuit output terminals 32 and 38 associated with positive and negative current groups 11 and 12 are each useful, for example, to activate or control blanking circuits. Such blanking circuits customarily suppress or divert firing signals produced by firing circuits associated with each of the current groups. Thus, the direct current output signal appearing at the output terminals of circuit section 24 and indicating the presence of positive output current flowing from the cycloconverter to the load can be employed to activate or trigger appropriate circuitry for suppressing or diverting firing signals supplied to negative current goup 12. Similarly, the direct current output signal appearing at the output terminals of circuit section 25 and indicating the presence of negative output current flowing from the cycloconverter to the load can be employed to activate or trigger appropriate circuitry for suppressing or diverting firing signals supplied to positive current group 11. The sensing and indicating circuit, comprised of sections 24 and 25, thus, enables the cycloconverter to be operated with the assurance that current-conducting groups will be prevented from conducting simultaneously and that one current group will not begin to conduct until the other current group has ceased to conduct. This protection against intergroup circulating currents can be enjoyed even when the output of the cycloconverter is direct current. In adidtion, the control circuits connected to the sensing and indicating circuits described herein are isolated from the cycloconverter power circuit resulting in a possible reduction in the number of separated isolated D.C. power supplies needed for the blanking and control circuits. The isolation also tends to keep to a minimum the power losses attributable to the sensing device.

Those skilled in the art will appreciate that various changes and modifications can be made in the apparatus described herein without departing from the spirit and scope of the invention.

We claim:
1. The combination of a cycloconverter and a sensing and indicating circuit for providing signals in accordance with output conditions of the cycloconverter,
   said cycloconverter having
      an input circuit for connection to an alternating current supply,
      an output circuit for connection to a load,
      a pair of current-conducting groups of switching and rectifying devices,
      circuit means connecting said groups in parallel with each other between and back to back with respect to said supply and said output circuits including supply circuit means associated with and connecting each group to said supply circuit, one of said pair of groups and its associated supply circuit means conducting to provide a flow of current in one direction in said cycloconverter output circuit and the other of said pair and its associated supply means conducting to provide a flow of current in the other direction in said cycloconverter output circuit, and
   said sensing and indicating circuit means having
      a first section associated with one of said cycloconverter groups and having output terminals for providing a first signal when current flows in said cycloconverter output circuit in one direction, and
      a second section associated with the other of said cycloconverter groups and having output terminals for providing a second signal when current flows in said cycloconverter output circuit in the opposite direction,
      each of said sections comprising current sensing means related to and in circuit with said supply circuit means connected to its associated cycloconverter group for sensing alternating current flow in said related supply circuit means and providing an alternating current signal proportional thereto, and current rectifying means connected to said section output terminals and to said current sensing means for rectifying alternating current signals provided by said current sensing means to provide a direct current signal at said section output terminals in accordance with the state of conduction of the associated cycloconverter current group.

2. Apparatus according to claim 1
in which said supply circuit means associated with each conducting group of said cycloconverter comprises alternating current phase conductors and
in which said current sensing means in each of said sections of said sensing and indicating circuit means comprises a current transformer winding inductively associated with each of said phase conductors of said associated supply circuit means and
in which said current rectifying means in each of said sections of said sensing and indicating circuit means comprises diode rectifiers connected to each of said current transformer windings comprising its respective section for rectifying alternating currents induced therein, said diode rectifiers in each of said sections being interconnected so that the direct currents produced by each are combined to provide at said output terminals a direct current signal proportional to the sum of alternating currents flowing in said phase conductors of said associated supply circuit means.

3. Apparatus according to claim 1
in which said supply circuit means associated with each of said current conducting groups of said cycloconverter comprises polyphase conductors and
in which said current sensing means in each of said sections of said sensing and indicating circuit means comprises a current transformer winding inductively associated with each polyphase conductor connected to the current conducting group associated with its respective section, said current transformer windings having center taps and the center taps of all the current transformer windings comprising each of said sections being connected together and to one of said output terminals of its associated section of said current sensing and indicating circuit means, and
in which said current rectifying means in each of said sections of said sensing and indicating circuit means comprises diode rectifiers connected between the ends of each of said current transformer windings and the other of said output terminals of its respective section, all of said diode rectifiers of each of said sections being arranged to conduct in the same direction with respect to said output terminal to which they are connected.

No references cited.

JOHN F. COUCH, *Primary Examiner.*

G. GOLDBERG, *Assistant Examiner.*